US010875569B2

(12) United States Patent
Ko

(10) Patent No.: US 10,875,569 B2
(45) Date of Patent: Dec. 29, 2020

(54) STEERING ARBITRATION APPARATUS AND METHOD OF VEHICLE, AND STEERING ARBITRATION SYSTEM HAVING THE SAME

(71) Applicant: MANDO CORPORATION, Pyeongtaek-si (KR)

(72) Inventor: Sang Jin Ko, Daejeon (KR)

(73) Assignee: MANDO CORPORATION, Pyeongtaek-si (KR)

( * ) Notice: Subject to any disclaimer, the term of this patent is extended or adjusted under 35 U.S.C. 154(b) by 530 days.

(21) Appl. No.: 15/398,127

(22) Filed: Jan. 4, 2017

(65) Prior Publication Data

US 2017/0190354 A1      Jul. 6, 2017

(30) Foreign Application Priority Data

Jan. 4, 2016   (KR) .................. 10-2016-0000446

(51) Int. Cl.
*B62D 5/04*   (2006.01)
*B62D 15/02*   (2006.01)
(Continued)

(52) U.S. Cl.
CPC .......... *B62D 5/0457* (2013.01); *B60W 10/20* (2013.01); *B60W 30/06* (2013.01); *B60W 30/12* (2013.01); *B60W 30/165* (2013.01); *B60W 30/18163* (2013.01); *B62D 15/025* (2013.01); *B62D 15/0285* (2013.01); *B60W 2420/42* (2013.01);
(Continued)

(58) Field of Classification Search
None
See application file for complete search history.

(56) References Cited

U.S. PATENT DOCUMENTS

2007/0129815 A1*   6/2007   Flemisch ................ G05B 7/02
                                                                      700/11
2007/0150118 A1*   6/2007   Takamatsu ............ B60W 10/04
                                                                        701/1
(Continued)

FOREIGN PATENT DOCUMENTS

CN         101823502 A         9/2010

OTHER PUBLICATIONS

Chinese Office Action dated Sep. 4, 2018 issued in Chinese Patent Application No. 201710004718.1 (with English translation).

*Primary Examiner* — Nicholas K Wiltey
(74) *Attorney, Agent, or Firm* — Morgan, Lewis & Bockius LLP

(57) ABSTRACT

The present invention relates to an arbitration method of an electric power steering apparatus of a vehicle and arbitration apparatus thereof. When overlay requests, which are steering apparatus operation commands or requests, are input from two or more steering-related control systems in a vehicle that includes an electric power steering apparatus and two or more steering-related control systems for controlling the electric power steering apparatus, the steering apparatus operation commands are selectively transferred to the steering apparatus according to the priority of the steering-related control system to adjust various steering-related controls to not conflict with each other, thereby maintaining the stability of the vehicle and making an optimal steering control.

20 Claims, 6 Drawing Sheets

(51) Int. Cl.
  *B60W 10/20* (2006.01)
  *B60W 30/06* (2006.01)
  *B60W 30/12* (2020.01)
  *B60W 30/165* (2020.01)
  *B60W 30/18* (2012.01)

(52) U.S. Cl.
  CPC ..... *B60W 2420/54* (2013.01); *B60W 2540/18* (2013.01)

(56) References Cited

U.S. PATENT DOCUMENTS

| | | | |
|---|---|---|---|
| 2007/0272464 A1* | 11/2007 | Takae | B60W 10/06 180/169 |
| 2010/0211264 A1* | 8/2010 | Wey | B62D 6/00 701/41 |
| 2015/0057891 A1* | 2/2015 | Mudalige | B60W 10/00 701/42 |
| 2015/0291216 A1* | 10/2015 | Sato | B60W 50/14 701/23 |
| 2017/0029026 A1* | 2/2017 | Okuda | B62D 15/0265 |
| 2017/0183013 A1* | 6/2017 | Matsumoto | B60W 30/18163 |
| 2017/0349212 A1* | 12/2017 | Oshida | B62D 15/0255 |
| 2018/0093666 A1* | 4/2018 | Kim | B60W 30/16 |
| 2018/0196443 A1* | 7/2018 | Bai | G05D 1/0276 |
| 2019/0041837 A1* | 2/2019 | Elenich | G05B 23/0243 |
| 2019/0193749 A1* | 6/2019 | Choi | H04L 69/14 |
| 2019/0315405 A1* | 10/2019 | Oh | B60W 50/0205 |

* cited by examiner

FIG. 4

| | Overlay Request Reception Table (Before) | | | Mode Selection Result Table (After) | | |
|---|---|---|---|---|---|---|
| | VSM | LKA/TJA | PAS | VSM | LKA/TJA | PAS |
| 1 | R | | | 1 | | |
| 2 | | R | | | 1 | |
| 3 | | | R | | | 1 |
| 4 | R | R | | 1 | S | |
| 5 | R | | R | 1 | | S |
| 6 | | R | R | 1 | S | S |
| 7 | R | R | R | 1 | S | S |
| 8 | | R | R | 1 | S | |
| 9 | 1 | 1 | | 1 | 0 | S |
| 10 | R | | R | 1 | 1 | S |
| 11 | | 1 | 1 | | | 0 |
| 12 | R | | 1 | 1 | | 0 |
| 13 | | R | 1 | | 1 | |

R : Overlay request (Request)
1 : Active (Active)
0 : Inactive (Inactive)
S : Standby (Standby)

STEERING ARBITRATION APPARATUS AND METHOD OF VEHICLE, AND STEERING ARBITRATION SYSTEM HAVING THE SAME

CROSS REFERENCE TO RELATED APPLICATION

This application claims priority from Korean Patent Application No. 10-2016-0000446, filed on Jan. 4, 2016, which is hereby incorporated by reference for all purposes as if fully set forth herein.

BACKGROUND OF THE INVENTION

1. Field of the Invention

The present invention relates to an arbitration method and an arbitration apparatus of an electric power steering apparatus of a vehicle, and more specifically, further relates to a steering arbitration method and a steering arbitration apparatus for controlling an electric power steering apparatus, when overlay requests are received from a plurality of steering-related control systems in the vehicle, according to the priority of the steering-related control system that has transmitted the corresponding overlay request.

2. Description of the Prior Art

An electric power steering apparatus of the vehicle is configured to include a torque sensor for sensing the torsion of a steering shaft that is connected to a steering wheel, an electric motor for rotating/moving a steering output shaft or a rack bar by interworking with the steering output shaft or the rack bar, and a steering ECU for controlling the rotation of the electric motor according to a steering torque value that is measured by the torque sensor.

Basically, such an electric power steering apparatus generates a steering assistance current in proportion to a steering torque according to the driver's operation of a steering wheel, and rotates the electric motor. That is, the electric power steering apparatus executes a basic operation to assist a driver's steering force.

However, with the recent development of a driving assistance system (DAS) and a demand for autonomous driving, the autonomous steering control or active steering control has been developed to automatically operate the electric power steering system regardless of the driver's intention in addition to a function of merely assisting the driver's steering force.

According to the autonomous steering control or the active steering control, there are a variety of steering-related control systems that affect the electric power steering system of the vehicle.

An example of the steering-related control system of the vehicle is a lane keeping assistance system (LKAS) that detects a lane to then control the vehicle to travel in a determined lane, and controls the vehicle to keep the lane by operating a steering system regardless of the driver's operation when there is a risk of lane departure.

In addition, in recent years, according to demands for autonomous driving or the like, a traffic jam assistance (TJA) system has been developed that makes a control to follow a front vehicle in the low-speed driving environment, such as a crowded area or a congested area in the downtown region, and the TJA recognizes the front vehicle in the congested area and automatically controls a steering system, as well as an engine of the vehicle and a braking system thereof, in order to thereby follow the front vehicle.

Furthermore, a parking assistance system (PAS) for assisting the parking of the vehicle recognizes a parking place and automatically controls a steering system in order to thereby move the vehicle to the parking place.

In addition, other steering-related control systems, such as a vehicle stability management (VSM) system, may be provided, and new steering-related control systems that are currently non-existent may be added according to the future technical development.

However, since the steering-related control systems operate the electric power steering system depending on steering control values that are calculated, respectively, a desired control may not be made in the case in which two or more steering-related control systems simultaneously operate the electric power steering system.

In particular, there may be a system that is constantly more important to the safety of the vehicle among various steering-related control systems, and there may be a system that is more important only in a specific driving condition.

In such an environment, when two or more steering-related control systems are trying to simultaneously control the electric power steering system, the control of the same is required, but the preparation for the same has not yet been provided.

SUMMARY OF THE INVENTION

An aspect of the present invention to solve such a problem is to provide an apparatus and a method for arbitrating electric power steering apparatus control operations of the steering-related control systems in a vehicle that includes an electric power steering apparatus and two or more steering-related control systems for controlling the electric power steering apparatus.

Another aspect of the present invention is to provide an apparatus and a method for arbitrating overlay requests that are received from two or more steering-related control systems, which are steering apparatus operation commands or requests, in a vehicle that includes an electric power steering apparatus and two or more steering-related control systems for controlling the electric power steering apparatus.

Another aspect of the present invention is to provide an apparatus and a method for selectively controlling operations of steering-related control systems according to the priority of the steering-related control system when overlay requests are received from two or more steering-related control systems.

In accordance with the aspects mentioned above, an embodiment of the present invention provides a steering arbitration apparatus of a vehicle, the apparatus including: a mode-selecting unit that is configured to receive overlay requests from two or more steering-related control systems and is configured to determine the active state, inactive state, or standby state of each of two or more steering-related control systems that have transmitted the overlay requests according to the type or priority of the system that has transmitted the overlay request; a per-mode overlay current calculating unit that is configured to calculate a final overlay current value according to the overlay request of the steering-related control system that is determined to be in the active state by the mode-selecting unit; and a final overlay current output unit that is configured to output the calculated final overlay current value to an electric power steering apparatus.

Another embodiment of the present invention provides a steering arbitration system of a vehicle, the system including: an electric power steering apparatus that is configured to include an electric power steering (EPS) controller, a final target current calculating unit, and an electric motor; two or more steering-related control systems that are configured to control the electric power steering apparatus; and a steering arbitration apparatus that is configured to receive overlay requests from two or more steering-related control systems, is configured to determine the active state, inactive state, or standby state of each of two or more steering-related control systems that have transmitted the overlay requests according to the type of priority of the system that has transmitted the overlay request, and is configured to calculate a final overlay current value according to the overlay request of the steering-related control system that is determined to be in the active state to then transfer the same to a final target current calculating unit of the electric power steering apparatus.

Another embodiment of the present invention provides a steering arbitration method of a vehicle, the method including: an overlay reception step of receiving overlay requests from two or more steering-related control systems; a mode selection step of determining the active state, inactive state, or standby state of each of two or more steering-related control systems that have transmitted the overlay requests according to the type or priority of the system that has transmitted the overlay request; a per-mode overlay current calculation step of calculating a final overlay current value according to the overlay request of the steering-related control system that is determined to be in the active state in the mode selection step; and a final overlay current output step of outputting the calculated final overlay current value to an electric power steering apparatus.

As described above, according to the present invention, it is possible to arbitrate electric power steering apparatus control operations of two or more steering-related control systems in the vehicle that includes the electric power steering apparatus and two or more steering-related control systems for controlling the electric power steering apparatus.

More specifically, when steering apparatus operation commands or requests (overlay requests) are received from two or more steering-related control systems, the steering apparatus operation commands are selectively transferred to the steering apparatus according to the priority of the steering-related control system so that an optimal steering control can be made while maintaining the stability of the vehicle.

When overlay requests are received from two or more steering-related control systems among the steering-related control systems, such as VSM, LKAS, TJA, or PAS, that automatically control the electric power steering apparatus regardless of the driver's steering force, it is possible to adjust various steering-related controls to not conflict with each other by selectively executing steering control commands according to the priority of VSM, LKAS, TJA, or PAS.

BRIEF DESCRIPTION OF THE DRAWINGS

The above and other objects, features, and advantages of the present invention will be more apparent from the following detailed description taken in conjunction with the accompanying drawings, in which:

FIG. 4 illustrates an operational process of a steering arbitration apparatus, according to the embodiment of the present invention;

DETAILED DESCRIPTION OF THE EXEMPLARY EMBODIMENTS

Figure 1:
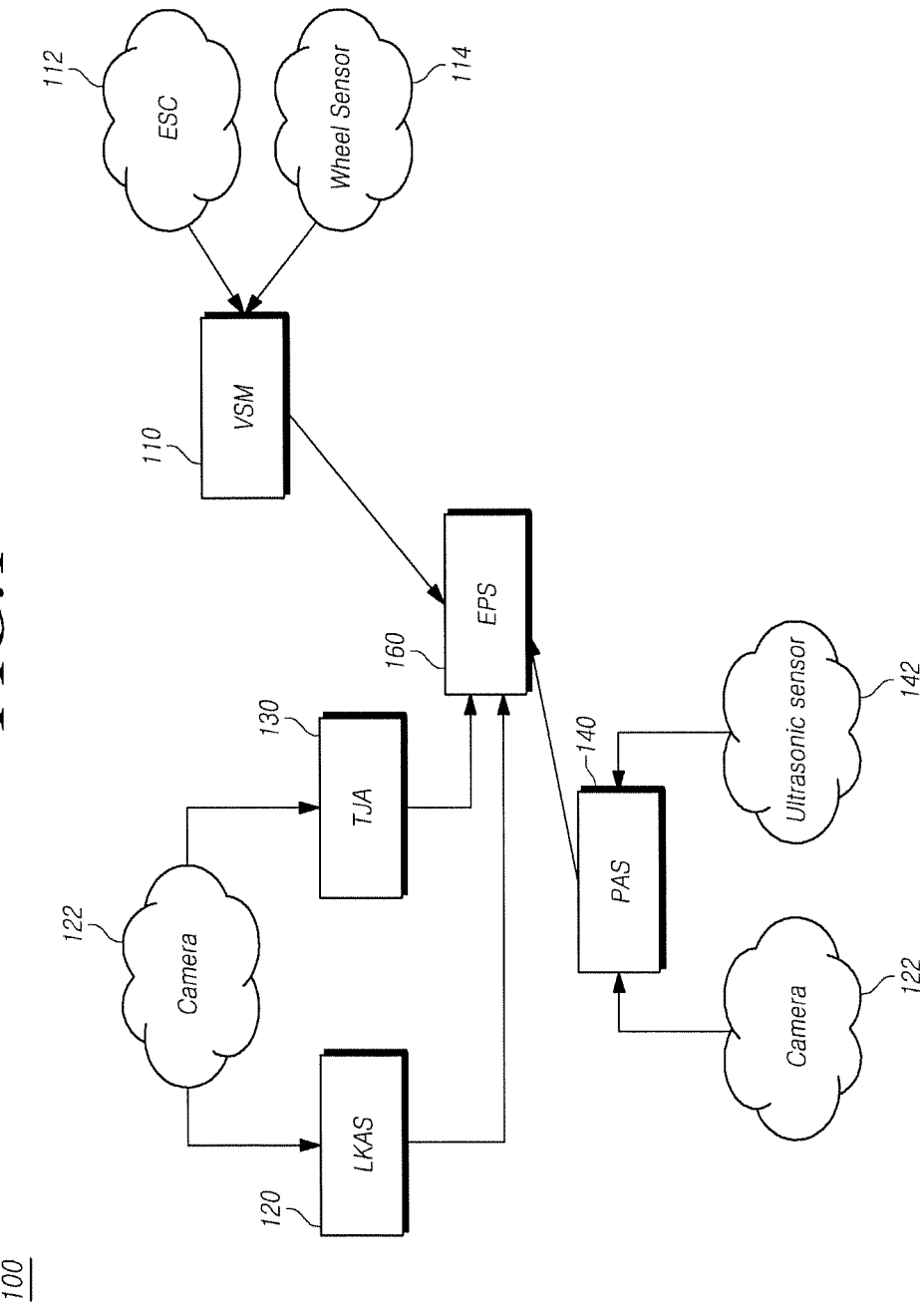
FIG. 1 illustrates the internal configuration of a vehicle that includes an electric power steering apparatus and two or more steering-related control systems (VSM, LKAS, TJA, and PAS) to which the present invention may be applied.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 illustrates the internal configuration of a vehicle that includes an electric power steering apparatus and two or more steering-related control systems (VSM, LKAS, TJA, and PAS) to which the present invention may be applied.

As shown in FIG. 1, an electric power steering apparatus and steering-related control systems that transmit steering commands or requests to the electric power steering apparatus to then control the electric power steering apparatus are provided inside the vehicle to which the present invention may be applied.

In the present specification, the term "steering-related control systems" will be used as a concept that includes all of the control systems that transmit steering commands or steering requests to enable a specific steering force to be applied to the electric power steering apparatus for the posture control of the vehicle.

At this time, the steering commands or the steering requests may contain an overlay torque request or an overlay angle request that requests the addition of an additional steering current, which is required by the corresponding steering-related control system, to the basic steering assistance current of the electric power steering apparatus.

That is, the steering commands or steering requests that are provided to the electric power steering apparatus by the corresponding steering-related control systems may be expressed in a unit of a desired torque value, steering current value, or rotational angle of the electric motor.

The steering-related control systems that can be applied to the present invention may include a vehicle stability management (VSM) system 110, a lane keeping assistance (LKA) system 120, a traffic jam assistance (TJA) system 130, and a parking assistance system (PAS) 140, but they are not limited thereto.

The vehicle stability management (VSM) system 110 maintains the vehicle body stability by integrally controlling a suspension device, a braking device, a driving force of an engine, and a steering apparatus when the vehicle stability is not secured. This may occur, for example, in the case where: the vehicle body is unstable when braking because the driving road surface is slippery or because the road surface frictional coefficients of the left and right wheels are different; or the vehicle body is unstable when cornering because of an incorrect steering operation of the driver.

Hereinafter, in the present specification, the vehicle stability management system will be abbreviated to VSM, and the VSM 110 may interwork with a variety of sensors, such as a wheel sensor 114 of the vehicle, or with a sub-system, such as an electronic stability control (ESC) 112, in order to maintain the vehicle posture.

The lane keeping assistance system (LKAS) 120 may detect the lane by using a front camera 122 or the like and may make a control to travel in a determined lane, which makes a control to keep the lane by operating the steering system regardless of the driver's operation when there is a risk of lane departure. Hereinafter, the lane keeping assistance system will be abbreviated to LKA in the present specification.

The traffic jam assistance (TJA) system 130 makes a control to follow a front vehicle in the low-speed driving environment, such as a crowded area or a congested area in the downtown region, which recognizes the front vehicle in the congested area by using the front camera 122 and automatically controls a steering system, as well as an engine of the vehicle and a braking system thereof, in order to thereby follow the front vehicle. Hereinafter, the traffic jam assistance system will be abbreviated to TJA.

Meanwhile, the steering-related control systems, such as LKA or TJA, that make an independent steering control from the driver's intention for steering in the course of vehicle travelling will be collectively referred to as an on-driving steering system in the present specification.

The on-driving steering system is separated from the general vehicle stability management (VSM) system or the parking assistance system (PAS), and may further include a lane change assistance system (LCA), an adaptive cruise control system (ACC), or a smart cruise control system (SCC), as well as LKA and TJA.

The lane change assistance system (LCA) operates the steering system by the driver's intention or automatic control to then assist the vehicle in the process of changing the lane or to then automatically change the lane.

The adaptive cruise control system (ACC) or the smart cruise control system (SCC) integrally controls a steering apparatus, an engine driving mechanism, and a braking device of the vehicle in order to thereby follow a front target, such as a front vehicle, or the lane during the driving of the vehicle.

Although only LKA and TJA will be described as an example of the on-driving steering system below, the same description may be applied to other systems, such as LCA or ACC (SCC).

The parking assistance system (PAS) 140 automatically or semi-automatically assists the parking of the vehicle, which recognizes a parking place and obstacles by using a camera 122 or an ultrasonic sensor 142 to then assist the vehicle in moving to the parking place by operating the electric power steering apparatus. Hereinafter, the parking assistance system will be abbreviated to PAS in the present specification.

The steering-related control systems, such as the VSM 110, LKA 120, TJA 130, or PAS 140, when its operation is activated, calculates an overlay steering current that is necessary for the operation in its mode to then transfer the same to the electric power steering (EPS) apparatus 160, and the electric power steering apparatus adds the overlay steering current to the basic steering assistance current to then determine the final target current and to then operate the motor.

Meanwhile, in some cases, when two or more steering-related control systems among VSM 110, LKA 120, TJA 130, and PAS 140 are simultaneously activated, two or more overlay steering currents are added to make a steering control. Accordingly, a desired steering control may not be made.

For example, when the VSM is also activated due to the occurrence of a slip of the vehicle body in the driving state in which the LKA is in operation, an overlay steering current value A of the LKA and an overlay steering current value B of the VSM are added to then make a control of the electric power steering apparatus.

In this case, a steering current in the amount of A is required to be added in order to keep the lane (LKA). However, the LKA and VSM may not be operated enough in the case where the steering control is made with a value of A+B.

In addition, the steering-related control systems may have priority.

For example, the VSM may have a higher priority than the PAS because the VSM that is related to the control of the vehicle body in a dangerous situation is more important than the PAS that is related to the parking assistance in a low-speed situation.

In addition, the on-driving steering system, such as LKA or TJA, may have a priority between the priorities of the VSM and PAS.

Therefore, the present invention proposes a method, when overlay requests are transferred to the electric power steering apparatus from two or more steering-related control systems having different priorities as described above, for determining the active mode of the steering-related control system that is to be activated according to the type and state of the steering-related control system that has transmitted the overlay request and for determining the final overlay steering current according to the determination.

Figure 2:
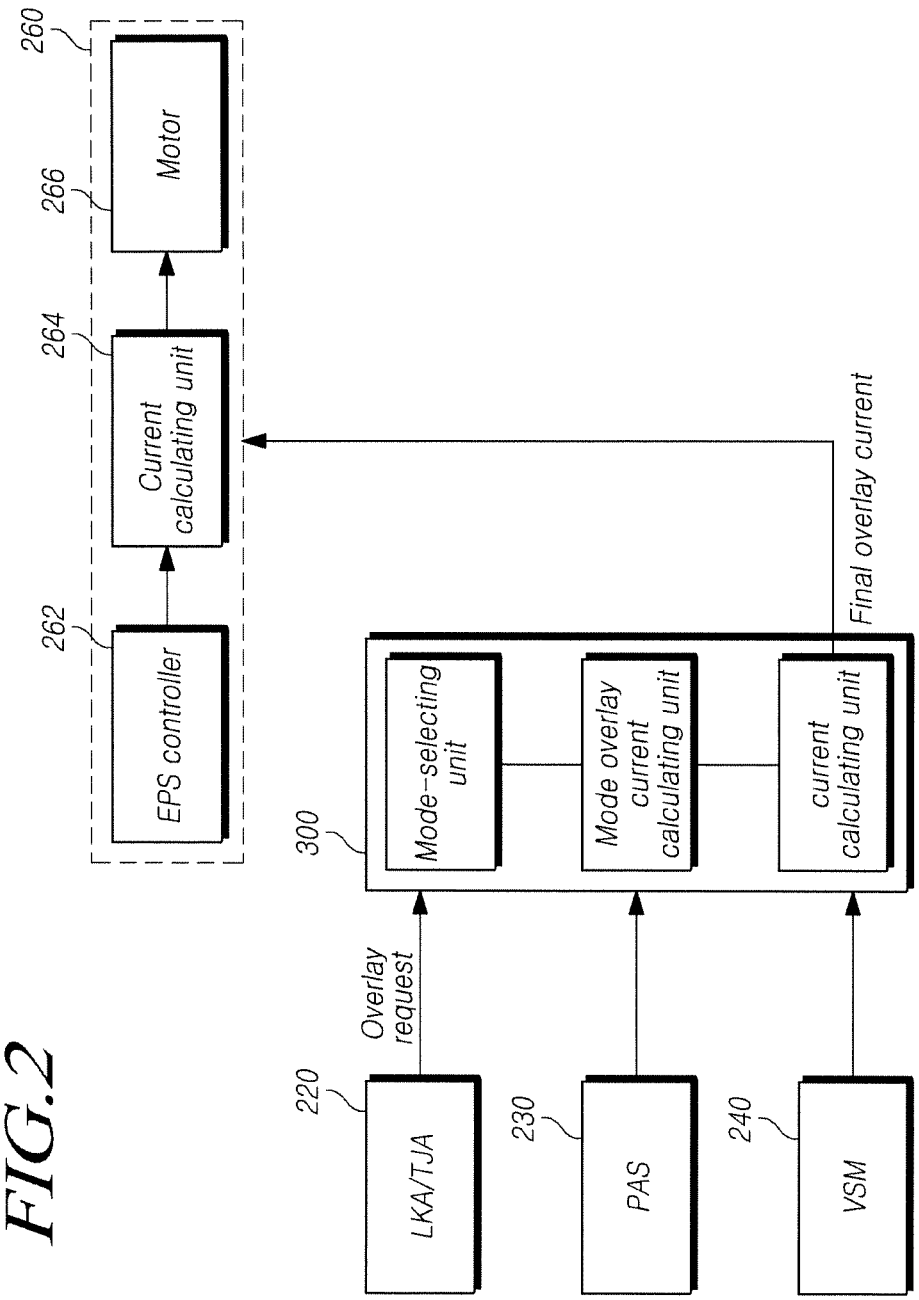
FIG. 2 is a block diagram showing the whole of a steering arbitration system, according to the embodiment of the present invention.
Figure 3:
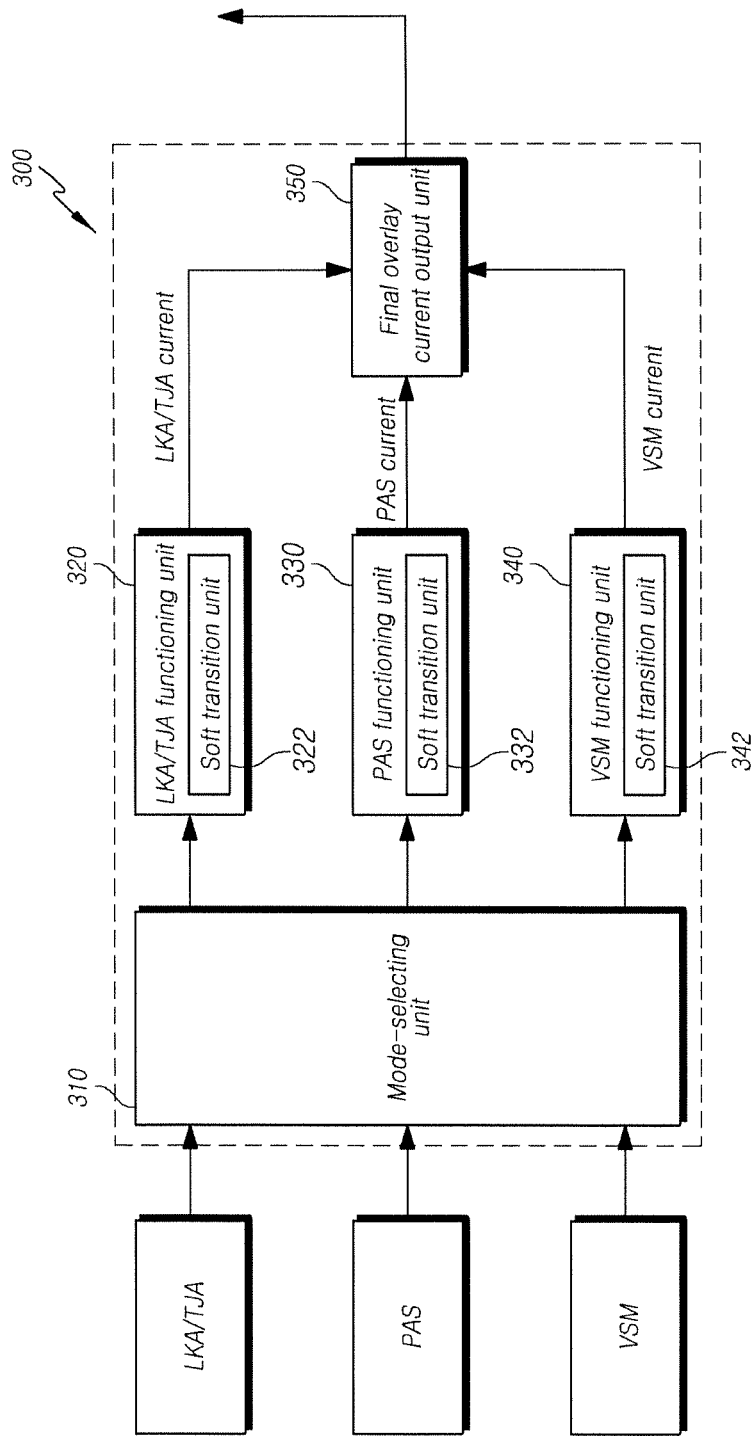
FIG. 3 is a view showing the internal configuration of a steering arbitration apparatus, according to the embodiment of the present invention.

FIG. 2 is a block diagram showing the whole of a steering arbitration system, according to the embodiment of the present invention, and FIG. 3 is a detailed functional block diagram of a steering arbitration apparatus, according to the present invention.

As shown in FIG. 2, the entire steering arbitration system, according to the embodiment of the present invention, is configured to include a steering arbitration apparatus 300, according to the present invention, an electric power steering apparatus 260, and LKA/TJA 220, PAS 230, and VSM 240 that correspond to two or more steering-related control systems.

That is, although the LKA/TJA 220 is described as an example of the on-driving steering system in the embodiment of FIG. 2, it is not limited thereto.

The electric power steering apparatus 260 may include an electric power steering (EPS) controller 262 that receives a steering torque value by a driver's steering force from the torque sensor or the like and then generates a steering assistance current, a final target current calculating unit 264 that receives a final overlay current value that is transferred from the steering arbitration apparatus of the present invention and adds the same to the steering assistance current value that is calculated by the EPS controller above to then calculate a final target current value, and an electric motor 266 that is controlled by the final target current value.

The steering arbitration apparatus 300, according to the present embodiment, is an apparatus that executes functions of: receiving overlay requests from two or more steering-related control systems; determining the active state, inactive state, and standby state of each of the two or more steering-related control systems that have transmitted the overlay requests according to the type or priority of the system that has transmitted the overlay request; calculating the final overlay current value according to the overlay request of the steering-related control system that is determined to be in the active state; and transferring the same to the final target current calculating unit of the electric power steering apparatus.

Such a steering arbitration apparatus may be implemented by hardware and/or software, and may be included inside the vehicle as a separate apparatus, or may be included as a part of a typical vehicle control system.

In addition, the steering arbitration apparatus 300 may be configured to include a mode-selecting unit 310 for determining the state of the steering-related control system that has transmitted the overlay request among two or more steering-related control systems, a per-mode overlay current calculating unit, and a final overlay current output unit 350.

In the present specification, the "overlay request" refers to a request message that is transmitted by the steering-related control system, such as VSM, LKA/TJA, or PAS, to the steering arbitration apparatus of the present invention in order to execute its targeted vehicle body control, and may contain an overlay torque value, an overlay steering angle value, overlay motor rotational angle information, or the like.

In addition, the "overlay current (value)" is a motor current value that is created based on an overlay torque value, an overlay steering angle value, or overlay motor rotational angle information, which is included in the overlay request that is transmitted from each steering-related control system, to be transmitted to the steering apparatus, and is a separate concept from the basic steering assistance current that is generated by the EPS controller 262 based on a driver's steering torque.

The "final overlay current (value)" means an overlay current value of a single steering-related control system that is selected by the steering arbitration apparatus of the present invention, and the final overlay current is added to the basic steering assistance current of the electric power steering apparatus in order to thereby determine the final target current for driving the electric motor.

The mode-selecting unit 310 included in the steering arbitration apparatus 300 executes functions of: receiving overlay requests from two or more steering-related control systems; and determining the active state, inactive state, or standby state of each of the two or more steering-related control systems that have transmitted the overlay requests according to the type or priority of the system that has transmitted the overlay request.

More specifically, in the case where there is an overlay request of the second steering-related control system while the first steering-related control system is activated, if the priority of the second steering-related control system is higher than the priority of the first steering-related control system, the mode-selecting unit 310 allows the second steering-related control system to be in the active state and allows the first steering-related control system to be in the inactive state. In addition, if the priority of the first steering-related control system is higher than the priority of the second steering-related control system, the mode-selecting unit 310 maintains the first steering-related control system to be in the active state and allows the second steering-related control system to be in the standby state.

In addition, when the overlay requests are input simultaneously or sequentially from two or more steering-related control systems, the mode-selecting unit 310 may allow the steering-related control system that has a higher priority to be in the active state and may allow the steering-related control system that has a lower priority to be in the standby state among the corresponding steering-related control systems.

The operation of selecting the mode by the mode-selecting unit 310 will be described in more detail below with reference to FIGS. 4 and 5.

Meanwhile, two or more steering-related control systems including the first and second steering-related control systems of the present invention may include a vehicle stability management (VSM) system, a lane keeping assistance (LKA) system, a traffic jam assistance (TJA) system, and a parking assistance system (PAS), but it is not limited thereto.

That is, the steering-related control systems may include other types of control systems for controlling the electric power steering apparatus, as well as VSM, LKA, TJA, and PAS, and the respective steering-related control systems are allocated with the priority in consideration of an effect to the vehicle, the driving state, or the like.

For example, among VSM, LKA, TJA, and PAS, the VSM may have the highest priority and the PAS may have the lowest priority while the LKA and TJA may have the same priority.

In addition, the priority of the steering-related control system may be constantly allocated, but may vary with the driving state.

For example, in the case where a slippery road condition is detected, the VSM may have the highest priority and the LKA, TJA, and PAS may have the same lower priority. In addition, in the case of a speed of less than a specific value, the TJA or PAS may have the highest priority, and the VSM and LKA may have lower priorities than that.

The priority of the steering-related control system may be given in consideration of the effect of the steering control to vehicle stability or the driving convenience by the corresponding system, and another steering-related control system with a constant priority may be added to VSM, LKA, TJA, and PAS.

Hereinafter, for the convenience, the description will be made on the assumption that: the VSM has the first priority; the LKA and TJA have the same second priority; and the PAS has the third priority.

The per-mode overlay current calculating unit included in the steering arbitration apparatus 300 of the present invention may execute a function of calculating a final overlay current value according to the overlay request of the steering-related control system that is determined to be in the active state by the mode-selecting unit, and more specifically, may include a VSM functioning unit 340 for calculating a VSM overlay current, an LKA/TJA functioning unit 320 for calculating an LKA or TJA overlay current, and a PAS functioning unit 330 for calculating a PAS overlay current.

Meanwhile, the active state refers to the state in which the corresponding overlay current by the steering-related control system is reflected to the final target current value, and more simply, it refers to the state in which the corresponding steering-related control system operates.

In addition, the inactive state refers to the state in which the operation in the active state is stopped by the mode-selecting unit, and is different from the standby state, which will be described later, in that the stopped state is maintained until the overlay request is transmitted to the steering arbitration apparatus again.

Meanwhile, the standby state refers to the state in which the operation is held until the operation of the currently activated steering-related control system is completed, and the standby mode is converted into the active mode after the overlay request of the activated steering-related control system is executed, which is different from the inactive mode in which the stopped mode is maintained until the overlay request is transmitted to the steering arbitration apparatus again.

Meanwhile, the mode-selecting unit 310 may determine the state of each steering-related control system that has transmitted the overlay request, and may then create at least one flag (that is, at least one of an active flag, an inactive flag, or a standby flag) to then transfer the same to the per-mode overlay current calculating unit.

In the present specification, for the convenience, the active flag or active state will be expressed as "1", the inactive flag or inactive state will be expressed as "0", the standby flag or standby state will be expressed as "S", and the state in which the overlay request is received will be expressed as "R".

Meanwhile, at least one of the VSM functioning unit 340, the LKA/TJA functioning unit 320, and the PAS functioning unit 330 that constitutes the per-mode overlay current calculating unit may include a soft transition unit that gradually changes the overlay current when its state is changed.

For example, in the case of a transition of the corresponding steering-related control system from the inactive state or standby state to the active state, the soft transition unit executes a function of gradually increasing the corresponding overlay current from zero to a target value. On the contrary, in the case of a transition of the corresponding steering-related control system from the active state to the inactive/standby state, the soft transition unit executes a function of gradually reducing the corresponding overlay current from the current value to zero.

An example of a change in the overlay current by the soft transition unit will be described in more detail with reference to FIG. 6 below.

According to the soft transition unit, it is possible to secure the safety of the vehicle body and to enhance a steering feeling of the driver by preventing an abrupt change in the overlay current when the activated steering-related control system is changed.

As described above, in the case of using the steering arbitration apparatus and the steering arbitration systems, according to the embodiment of the present invention, a safe steering control can be made by controlling the operation selectively or sequentially depending on the priority or the like even when overlay requests are input from a plurality of steering-related control systems, such as VSM, LKA, TJA, or PAS.

FIG. 4 illustrates an operational process by the steering arbitration apparatus, according to the embodiment of the present invention.

The description of FIG. 4 will be made on the assumption that VSM, LKA, TJA, and PAS are provided as an example of the steering-related control systems, and the VSM has the first priority, the LKA and TJA have the same second priority, and the PAS has the third priority.

In addition, the left table shows the state (Before) at the time when the steering arbitration apparatus of the present invention receives the overlay requests, and the right table shows the state (After) after the mode selection is completed by the steering arbitration apparatus of the present invention.

In addition, as described above, the active state will be expressed as "1", the inactive state will be expressed as "0", the standby state will be expressed as "S", and the state in which the overlay request is received will be expressed as "R".

Items 1 to 3 of FIG. 4 show the case where the overlay request is received from a single steering-related control system, respectively, and in this case, the steering-related control system that has transmitted the overlay request is activated to operate according to a typical method instead of using the steering arbitration apparatus of the present invention. That is, an overlay current of the activated steering-related control system is generated and transmitted to the electric power steering apparatus to then operate the steering electric motor.

Items 4 to 7 of FIG. 4 correspond to the case where overlay requests are received from two or more steering-related control systems simultaneously or sequentially at a short time interval in a state in which there is no steering-related control system that is activated to operate.

In this case, the mode-selecting unit 310 of the steering arbitration apparatus determines the steering-related control system that has a higher priority to be in the active state (1) and determines the steering-related control system that has a lower priority to be in the standby state (S) among the two or more steering-related control systems that have transmitted the overlay requests.

For example, when the overlay requests are simultaneously received from the VSM and the PAS as shown in the item 5, the VSM having a higher priority is selected to be in the active state (1), and the PAS having a lower priority is determined to be in the standby state (S).

In addition, when the overlay requests are simultaneously received from all of three steering-related control systems, the VSM, the LKA/TJA, and the PAS as shown in the item 7, only the VSM having the highest priority is selected to be in the active state (1), and the LKA/TJA and the PAS having lower priorities than that are determined to be in the standby state (S).

The overlay requests of the steering-related control systems that are determined to be in the standby state (S) may be performed only when there is no other overlay request after the operation of the currently activated steering-related control system is completed.

The standby state (S) may be maintained for a constant period of time, and may then be converted into the inactive state (0) after the lapse of a predetermined time by using a timer function.

In addition, after the operation of the steering-related control system in the active state, it may be determined whether or not the standby state (s) is released and whether or not re-execution is to be made by sensing the surrounding situation by using a separate sensor.

For example, if the PAS is in the standby state while the VSM is in the active state (item 5 of FIG. 4 above), it may be determined whether or not a PAS button continues to be pressed or whether or not an image of the parking place is detected by a camera after the completion of the VSM control, and then the operation of the PAS in the standby state may be performed.

Items 8 to 13 of FIG. 4 correspond to the case where overlay requests are received from one or more of the second other steering-related control systems while the first one steering-related control system is in the active state.

In this case, if the priority of the second steering-related control system is higher than the priority of the first steering-related control system, the mode-selecting unit 310 of the steering arbitration apparatus 300 configures the second steering-related control system to be in the active state (1), and converts the first steering-related control system into the inactive state (0).

On the contrary, if the priority of the first steering-related control system is higher than the priority of the second steering-related control system, the mode selecting unit 310 maintains the active state (1) of the first steering-related control system, and configures the second steering-related control system to be in the standby state (S).

For example, as shown in the item 10 of FIG. 4, in the state in which the LKA/TJA is activated, when an overlay request is received from the VSM that has a higher priority than the same, the VSM is configured to be in the active state, and the LKA/TJA in operation is stopped to then be converted into the inactive state.

On the contrary, as shown in the item 11 of FIG. 4, in the state in which the LKA/TJA is activated, when an overlay request is received from the PAS that has a lower priority than the same, the LKA/TJA is maintained to be in the active state (1), and the PAS is configured to be in the standby state (S).

That is, if the overlay request is received from the steering-related control system that has a higher priority than that of the steering-related control system that is currently in operation, the previous control in operation is immediately stopped so that the control corresponding to the higher priority, which makes a bigger impact on the vehicle, may be operated without errors.

In addition, if the overlay request is received from the steering-related control system that has a lower priority than that of the steering-related control system that is currently in operation, the previous control in operation continues to be executed, and the overlay request received later waits for a while to then be executed after the previous control is completed. Therefore, two or more controls can be made sequentially in order to thereby improve the convenience.

Figure 5:
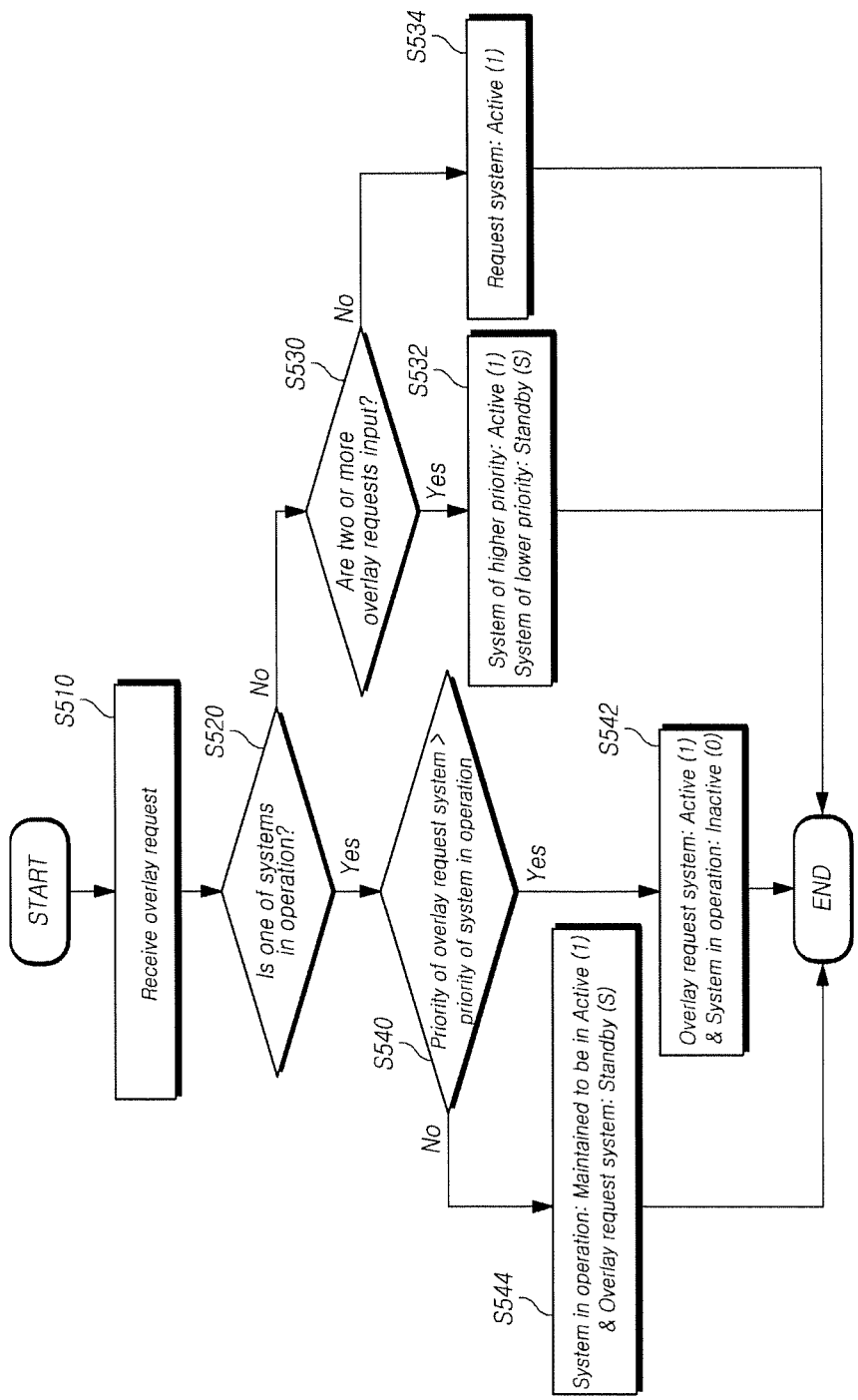
FIG. 5 illustrates a flowchart of a mode selecting process in a steering arbitration method, according to the embodiment of the present invention.

FIG. 5 illustrates a flowchart of a mode selection operation in a steering arbitration method, according to the embodiment of the present invention.

The steering arbitration method of the present invention may be carried out by the steering arbitration apparatus, as shown in FIG. 3, which is implemented inside the vehicle.

The overall steering arbitration method, according to the present invention, may include: an overlay reception step of receiving overlay requests from two or more steering-related control systems; a mode selection step of determining the active state, inactive state, or standby state of each of two or more steering-related control systems that have transmitted the overlay requests according to the type or priority of the system that has transmitted the overlay request; a per-mode overlay current calculation step of calculating a final overlay current value according to the overlay request of the steering-related control system that is determined to be in the active state in the mode selection step; and a final overlay current output step of outputting the calculated final overlay current value to an electric power steering apparatus.

Among the operations above, the mode selection step will be described in more detail with reference to FIG. 5.

In the mode selection step of the steering arbitration method, according to the present invention, first, the steering arbitration apparatus receives overlay requests from the steering-related control systems, such as VSM, LKA, TJA, or PAS, that are provided in the vehicle (S510).

Next, it is determined whether or not one of the steering-related control systems is in operation (S520), and if no steering-related control system is in operation, it is determined whether or not two or more overlay requests have been received (S530).

If there is a steering-related control system that is in operation in step S520, it is determined whether or not the priority of the steering-related control system that has transmitted the overlay request is higher than the priority of the steering-related control system that is currently in operation (S540).

If the priority of the steering-related control system that has transmitted the overlay request is higher than the priority of the steering-related control system that is currently in operation, the state of the steering-related control system in operation is converted into the inactive state (0), and the steering-related control system that has transmitted the overlay request is configured to be in the active state (1) (S542).

If the priority of the steering-related control system that has transmitted the overlay request is lower than the priority of the steering-related control system that is currently in operation, the state of the steering-related control system in operation is maintained to be in the active state (1), and the steering-related control system that has transmitted the overlay request is configured to be in the standby state (S) (S544).

Meanwhile, if no steering-related control system is in operation and there are two or more overlay requests in step S530, the steering-related control system that has a higher priority is configured to be in the active state (1) and the one or more remaining steering-related control systems that have lower priorities are configured to be in the standby state (S) among the two or more steering-related control systems that have transmitted the overlay requests (S532).

Of course, if no steering-related control system is in operation and there is one overlay request in step S530, the operation of the corresponding steering-related control system may be performed (S534).

Figure 6:
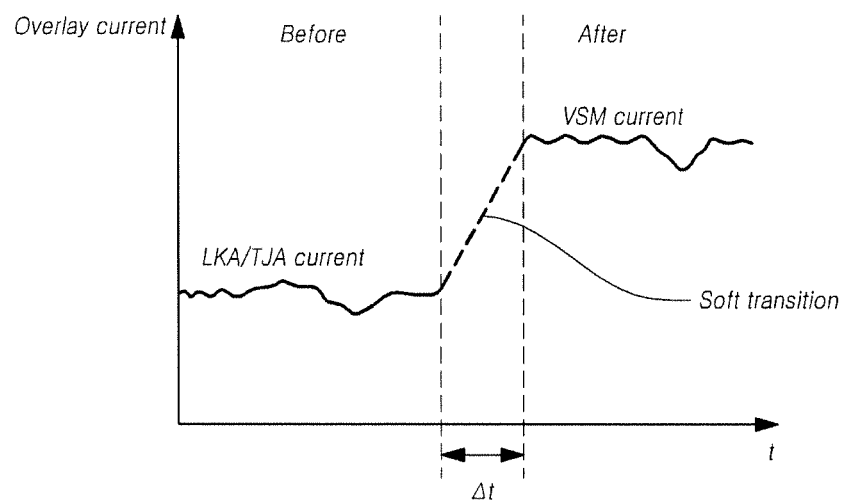
FIG. 6 is a view to explain a function of a soft transition unit that is used in the embodiment of the present invention.

FIG. 6 is a view to explain a function of the soft transition unit that is used in the embodiment of the present invention.

As described above, at least one of the VSM functioning unit 340, the LKA/TJA functioning unit 320, or the PAS functioning unit 330 that is included in the per-mode overlay current calculating unit of the steering arbitration apparatus 300, according to the present invention, may include a soft transition unit that gradually varies the overlay current when its state is changed.

FIG. 6 explains the effect of the soft transition unit, and, for example, as shown in item 10 of FIG. 4, illustrates the case where the overlay request is received from the VSM having a higher priority than the LKA/TJA while the LKA/TJA is in operation.

In this case, the LKA/TJA is changed from the active state to the inactive state, and the VSM is configured to be in the active state.

Therefore, as shown in FIG. 6, the LKA/TJA overlay current is applied to the electric power steering apparatus at the time before the mode is changed, and the VSM overlay current is required to be added to the target steering current after the mode is changed.

At this time, in order to prevent an abrupt change in the current between two overlay currents (between the LKA/TJA overlay current and the VSM overlay current), the soft transition unit 342 included in the VSM functioning unit 340 makes a control such that the current gradually changes (a dotted line) between two overlay currents for the mode change period (Δt).

To this end, the overlay current calculating unit (the VSM functioning unit) that is activated when changing the mode may receive the final overlay current value (the LKA/TJA current) at the time just before the mode changes from the overlay current calculating unit (the LKA/TJA functioning unit) that is previously operated, and may perform a gradual increase or decrease in the overlay current by using the soft transition unit 342.

Even when the steering-related control system that is activated by the steering arbitration apparatus, according to the present embodiment, is changed, since an abrupt change of the control current applied to the steering electric motor may be prevented by the soft transition unit, it is possible to provide a stable steering control and steering feeling.

As described above, according to the steering arbitration apparatus and method in the embodiment of the present invention, when overlay requests are received from two or more steering-related control systems among the steering-related control systems (such as VSM, LKA, TJA, or PAS) for automatically controlling the electric power steering apparatus regardless of a driver's steering force, steering control commands can be selectively executed according to the priority of the VSM, LKA, TJA, or PAS in order to thereby adjust various steering-related controls to not conflict with each other.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A steering arbitration apparatus of a vehicle, the apparatus comprising a controller configured to:
receive overlay requests from two or more steering-related control systems and configured to determine an active state, an inactive state, or a standby state of each of the two or more steering-related control systems that have transmitted the overlay requests according to a type or priority of the system that has transmitted the overlay request,
calculate a final overlay current value according to the overlay request of the steering-related control system that is determined to be in the active state, and
output the calculated final overlay current value to an electric power steering apparatus,
wherein an operation of a steering-related control system is held in a standby state until an operation of a currently active steering-related control system is completed, and upon completion of the currently active steering-related-control system and upon receiving the overlay request from the steering-related control system being held in the standby state, the controller causes the steering-related control system being held in the standby state to be activated.

2. The steering arbitration apparatus of claim 1, wherein the two or more steering-related control systems are at least one of a vehicle stability management (VSM) system, an on-driving steering system, or a parking assistance system (PAS).

3. The steering arbitration apparatus of claim 2, wherein the on-driving steering system includes at least one of a lane keeping assistance (LKA) system, a traffic jam assistance (TJA) system, a lane change assistance (LCA) system, or an adaptive cruise control (ACC) system.

4. The steering arbitration apparatus of claim 3, wherein, when the two or more steering-related control systems include the VSM system and the PAS, the VSM has the highest priority and the PAS has the lowest priority.

5. The steering arbitration apparatus of claim 4, wherein, when the two or more steering-related control systems further include the on-driving steering system which includes the LKA system and TJA system, the controller is configured to:
calculate a VSM overlay current,
calculate an LKA or TJA overlay current, and
calculate a PAS overlay current.

6. The steering arbitration apparatus of claim 5, wherein the controller is further configured to gradually vary the corresponding overlay current in the case of its transition from the inactive state or standby state to the active state.

7. The steering arbitration apparatus of claim 1, wherein, when the two or more steering-related control systems include first and second steering-related control systems, in the case where there is an overlay request of the second steering-related control system while the first steering-related control system is activated,
if the priority of the second steering-related control system is higher than the priority of the first steering-related control system, the controller allows the second steering-related control system to be in the active state and allows the first steering-related control system to be in the inactive state, and
if the priority of the first steering-related control system is higher than the priority of the second steering-related control system, the controller maintains the first steering-related control system to be in the active state and allows the second steering-related control system to be in the standby state.

8. The steering arbitration apparatus of claim 1, wherein the two or more steering-related control systems include first and second steering-related control systems, and
wherein when overlay requests are input from the first and second steering-related control systems, the controller allows the steering-related control system that has a higher priority to be in the active state and allows the steering-related control system that has a lower priority to be in the standby state among the first and second steering-related control systems.

9. The steering arbitration apparatus of claim 5, wherein the controller is further configured to gradually vary the corresponding overlay current in the case of its transition from the inactive state or standby state to the active state.

10. A steering arbitration system of a vehicle, the system comprising:

an electric power steering apparatus configured to include an electric power steering (EPS) controller, an electronic control unit (ECU), and an electric motor; and two or more steering-related control systems configured to control the electric power steering apparatus, wherein the ECU is configured to:
- receive overlay requests from two or more steering-related control systems,
- determine an active state, an inactive state, or a standby state of each of the two or more steering-related control systems that have transmitted the overlay requests according to a type or priority of the system that has transmitted the overlay, and
- calculate a final overlay current value according to the overlay request of the steering-related control system that is determined to be in the active state and transfer the final overlay current value to the ECU, wherein an operation of a steering-related control system is held in a standby state until an operation of a currently active steering-related control system is completed, and upon completion of the currently active steering-control system and upon receiving the overlay request from the steering-related control system being held in the standby state, the EPS causes the steering-related control system being held in the standby state to be activated.

11. The steering arbitration system of claim 10, wherein, when the two or more steering-related control systems include first and second steering-related control systems, in the case where there is an overlay request of the second steering-related control system while the first steering-related control system is activated,
- if the priority of the second steering-related control system is higher than the priority of the first steering-related control system, the ECU allows the second steering-related control system to be in the active state and allows the first steering-related control system to be in the inactive state, and
- if the priority of the first steering-related control system is higher than the priority of the second steering-related control system, the ECU maintains the first steering-related control system to be in the active state and allows the second steering-related control system to be in the standby state.

12. The steering arbitration system of claim 10, wherein the two or more steering-related control systems include first and second steering-related control systems, and
wherein, when overlay requests are input from the first and second steering-related control systems, the ECU allows the steering-related control system that has a higher priority to be in the active state and allows the steering-related control system that has a lower priority to be in the standby state among the first and second steering-related control systems.

13. The steering arbitration system of claim 12, wherein the first and second steering-related control systems are at least one of a vehicle stability management (VSM) system, an on-driving steering system that includes at least one of a lane keeping assistance (LKA) system or a traffic jam assistance (TJA) system, or a parking assistance system (PAS), and
wherein, when the first and the second steering-related control systems include the VSM system and the PAS, the VSM has the highest priority and the PAS has the lowest priority.

14. The steering arbitration system of claim 13, wherein, when the first and the second steering-related control systems further includes the on-driving steering system which includes the LKS system and the TJA system, the ECU calculates a VSM overlay current, calculate an LKA or TJA overlay current, and calculate a PAS overlay current.

15. The steering arbitration system of claim 14, wherein the ECU gradually varies the corresponding overlay current in the case of its transition from the inactive state or standby state to the active state.

16. A steering arbitration method of a vehicle, the method comprising:
- receiving overlay requests from two or more steering-related control systems;
- determining an active state, an inactive state, or a standby state of each of two or more steering-related control systems that have transmitted the overlay requests according to a type or priority of the system that has transmitted the overlay request;
- calculating a final overlay current value according to the overlay request of the steering-related control system that is determined to be in the active state; and
- outputting the calculated final overlay current value to an electric power steering apparatus, wherein an operation of a steering-related control system is held in a standby state until an operation of a currently active steering-related control system is completed, and upon completion of the currently active steering-related control system and upon receiving the overlay request from the steering-related control system being held in the standby state, the steering-related control system being held in the standby state is automatically activated.

17. The method according to claim 16, wherein, in the determining of the state, when the two or more steering-related control systems include first and second steering-related control systems, in the case where there is an overlay request of the second steering-related control system while the first steering-related control system is activated,
- if the priority of the second steering-related control system is higher than the priority of the first steering-related control system, the second steering-related control system is configured to be in the active state and the first steering-related control system is configured to be in the inactive state, and
- if the priority of the first steering-related control system is higher than the priority of the second steering-related control system, the first steering-related control system is maintained to be in the active state and the second steering-related control system is configured to be in the standby state.

18. The method according to claim 16,
wherein, in the determining of the state, when the two or more steering-related control systems include first and second steering-related control systems, in a state in which overlay requests are input from the first and second steering-related control systems, the steering-related control system that has a higher priority is configured to be in the active state and the steering-related control system that has a lower priority is configured to be in the standby state among the first and second steering-related control systems.

19. The method according to claim 18, wherein the first and second steering-related control systems are at least one of a vehicle stability management (VSM) system, an on-driving steering system, or a parking assistance (PAS) system, and wherein, when the first and second steering-related control systems include the VSM system and the PAS system, the VSM has the highest priority and the PAS has the lowest priority.

20. The method according to claim 19, wherein the on-driving steering system includes at least one of a lane keeping assistance (LKA) system, a traffic jam assistance (TJA) system, a lane change assistance system (LCA), or an adaptive cruise control (ACC) system.

* * * * *